US010028283B2

United States Patent
Cheng

(10) Patent No.: US 10,028,283 B2
(45) Date of Patent: Jul. 17, 2018

(54) DYNAMIC PHYSICAL UPLINK CONTROL CHANNEL (PUCCH)

(71) Applicant: Alcatel-Lucent USA Inc., Murray Hill, NJ (US)

(72) Inventor: Fang-Chen Cheng, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/972,577

(22) Filed: Dec. 17, 2015

(65) Prior Publication Data

US 2017/0171866 A1    Jun. 15, 2017

Related U.S. Application Data

(60) Provisional application No. 62/145,881, filed on Apr. 10, 2015.

(51) Int. Cl.
*H04W 72/04* (2009.01)
*H04W 72/12* (2009.01)

(52) U.S. Cl.
CPC ... *H04W 72/0493* (2013.01); *H04W 72/0413* (2013.01); *H04W 72/0426* (2013.01); *H04W 72/0433* (2013.01); *H04W 72/1257* (2013.01); *H04W 72/1284* (2013.01)

(58) Field of Classification Search
CPC ......... H04W 72/0493; H04W 72/0413; H04W 72/0426; H04W 72/0433; H04W 72/1257; H04W 72/1284
See application file for complete search history.

(56) References Cited

U.S. PATENT DOCUMENTS

| | | |
|---|---|---|
| 2008/0311919 A1 | 12/2008 | Whinnett et al. |
| 2009/0225738 A1 | 9/2009 | Xu et al. |
| 2011/0081932 A1 | 4/2011 | Astely et al. |
| 2012/0307781 A1* | 12/2012 | Enomoto ............ H04L 1/1861 370/329 |
| 2013/0315198 A1* | 11/2013 | Krishna Kumar .... H04L 1/0009 370/330 |
| 2014/0029537 A1* | 1/2014 | Golitschek Edler von Elbwart ............ H04W 72/042 370/329 |

(Continued)

FOREIGN PATENT DOCUMENTS

EP    2445295 A1    4/2012

OTHER PUBLICATIONS

International Search Report dated Jun. 22, 2016 in PCT/US2016/025968.

*Primary Examiner* — Duc C Ho
(74) *Attorney, Agent, or Firm* — Harness, Dickey & Pierce, P.L.C.

(57) ABSTRACT

A radio access network element includes a transceiver and a processor. The transceiver is configured to communicate with at least a first user equipment. The processor is operatively coupled to the transceiver, and the processor is configured to allocate first wireless resources for transmission of first control information by the first user equipment on an uplink control channel during at least a first subframe among a plurality of subframes of a radio frame. The first wireless resources are assigned a format independent of wireless resources allocated for transmission during others of the plurality of subframes of the radio frame.

19 Claims, 6 Drawing Sheets

(56) References Cited

U.S. PATENT DOCUMENTS

| | | | | |
|---|---|---|---|---|
| 2014/0198678 A1* | 7/2014 | Kim | .................. | H04W 24/06 370/252 |
| 2014/0211873 A1* | 7/2014 | Park | .................. | H04B 7/0617 375/267 |
| 2015/0365928 A1* | 12/2015 | Lee | .................. | H04W 72/04 370/329 |

* cited by examiner

FIG. 4

DYNAMIC PHYSICAL UPLINK CONTROL CHANNEL (PUCCH)

CROSS-REFERENCE TO RELATED APPLICATION(S)

This application is a non-provisional of, and claims priority under 35 U.S.C. § 119(e) to, provisional U.S. patent application No. 62/145,881, filed on Apr. 10, 2015, the entire contents of which are incorporated herein by reference.

BACKGROUND

In $3^{rd}$ Generation Partnership Project Long-Term Evolution (3GPP-LTE) Release 8 (Rel-8) and Release 10 (Rel-10), the Physical Uplink Control CHannel (PUCCH) is designed to allocate wireless resources (e.g., physical resource blocks (PRBs) to user equipments (UEs) for transmissions semi-statically. In this regard, PUCCH formats 1, 1a, and 1b are defined in Rel-8 to support Acknowledgement/Negative (A/N) feedback (e.g., transmission of A/N bits) with a multiplexing capacity of up to 24 UEs. In Rel-10, PUCCH format 1b with channel selection was specified to support up to 4 UEs. Also in Rel-10, PUCCH format 3 was designed to support up to 20 bits with multiplexing capacity of 5 UEs. However, since the PUCCH resources for formats 1, 1a, 1b and 3 are allocated semi-statically, the allocated resources persist for multiple subframes of a radio frame. Accordingly, assigned resources are not reused when the load is relatively low or zero in a cell and/or format. Moreover, the modulation and coding schemes (MCS) for the PUCCH are designed for coverage, and fixed for PUCCH formats 1, 1a, 1b and 3. In this context, the multiplexing capacity is fixed even when all UEs are experiencing relatively good channel conditions.

SUMMARY

One or more example embodiments provided a Physical Uplink Control Channel (PUCCH) configuration and/or design capable of supporting uplink control information (UCI) feedback for aggregation of up to 32 component carriers.

The PUCCH format for UCI on a primary cell (PCell) supporting aggregation of up to 32 component carriers may be applicable to both frequency division duplexing (FDD) and time division duplexing (TDD).

A PUCCH format according to at least some example embodiments may have at least the following properties: (i) dynamic PUCCH resource allocation with explicit physical resource block (PRB) indication in the downlink (DL) grant to improve resource utilization and achieve frequency selective channel gain; (ii) dynamic modulation and coding scheme (MCS) with an indication in the DL grant to achieve link adaption; (iii) improved A/N feedback protection with channel coding, such as turbo code, tail-biting convolutional coding (TBCC), block coding, etc.; (iv) improved A/N reliability with cyclic redundancy check (CRC) attachment; and (v) more flexible multiplexing of different numbers of ACK/NACK bits from different user equipments (UEs) by using orthogonal cover code (OCC).

At least one example embodiment provides a radio access network element comprising: a transceiver configured to communicate with at least a first user equipment; and a processor operatively coupled to the transceiver, the processor being configured to allocate first wireless resources for transmission of first control information by the first user equipment on an uplink control channel during at least a first subframe among a plurality of subframes of a radio frame, the first wireless resources being assigned a format independent of wireless resources allocated for transmission during others of the plurality of subframes of the radio frame.

According to at least some example embodiments, the wireless resources may include physical resource block (PRB) pairs; and the processor may be further configured to assign PRB pairs having different formats for transmission on the uplink control channel during the first and at least one second subframe from among the plurality of subframes of the radio frame. The uplink control channel may be a Physical Uplink Control Channel (PUCCH).

The processor may be further configured to allocate second wireless resources for transmission of second control information by a second user equipment on the uplink control channel semi-statically such that a format of the second wireless resources persist throughout multiple ones of the plurality of subframes of the radio frame.

The processor may be further configured to assign a modulation and coding scheme for transmission of the first control information by the first user equipment on the uplink control channel within the first subframe, the modulation and coding scheme being determined independent of a modulation and coding scheme assigned for transmissions on the uplink control channel in the others of the plurality of subframes.

The processor may be further configured to determine the modulation and coding scheme based on channel conditions for the first user equipment.

The transceiver may be further configured to transmit wireless resource allocation information indicative of the first wireless resources allocated to the first user equipment for transmission of the first control information on the uplink control channel.

The wireless resource allocation information may be transmitted along with a downlink grant for a downlink shared channel between the radio access network element and the first user equipment.

The wireless resource allocation information may include a number of bits, the number of bits being determined based on system bandwidth.

The first control information may be Hybrid Automatic Retransmission reQuest (HARQ) ACKnowledgment/Negative ACKnowledgment (ACK/NACK) information.

At least one other example embodiment provides a radio access network element comprising: a transceiver configured to communicate with a plurality of user equipments; and a processor operatively coupled to the transceiver, the processor being configured to allocate wireless resources to the plurality of user equipments for transmission of control information on an uplink control channel in a plurality of subframes of a radio frame, the wireless resources being allocated to the plurality of user equipments dynamically such that a format of at least a portion of the allocated wireless resources does not persist for greater than 1 subframe of the radio frame.

According to at least some example embodiments, the processor may be further configured to allocate wireless resources for uplink control channel transmissions within each of the plurality of subframes independent of allocation of the wireless resources for uplink control channel transmissions in others of the plurality of subframes.

At least one other example embodiment provides a radio access network element comprising: a transceiver configured to communicate with a plurality of user equipments;

and a processor operatively coupled to the transceiver, the processor being configured to assign modulation and coding schemes for transmission of control information by the plurality of user equipments on an uplink control channel within a plurality of subframes of a radio frame, the modulation and coding schemes being determined dynamically for each of the plurality of subframes based on channel conditions for the plurality of user equipments.

According to at least some example embodiments, the uplink control channel may be a Physical Uplink Control Channel (PUCCH).

The modulation and coding schemes may include at least one of BPSK, QPSK, 16-QAM, and 64-QAM.

The processor may be further configured to determine the channel conditions for the plurality of user equipments based on channel quality information (CQI).

The transceiver may be further configured to signal the assigned modulation and coding schemes to the plurality of user equipments using downlink control information (DCI) format indicators.

The transceiver may be further configured to transmit, along with the assigned modulation and coding schemes, wireless resource allocation information indicative of wireless resources allocated to the plurality of user equipments for transmission of the control information on the uplink control channel in the subframe.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

FIG. 4 illustrates example Walsh coding for OCC-2, OCC-4 and OCC-8, in accordance with an example embodiment.

Figure 1:
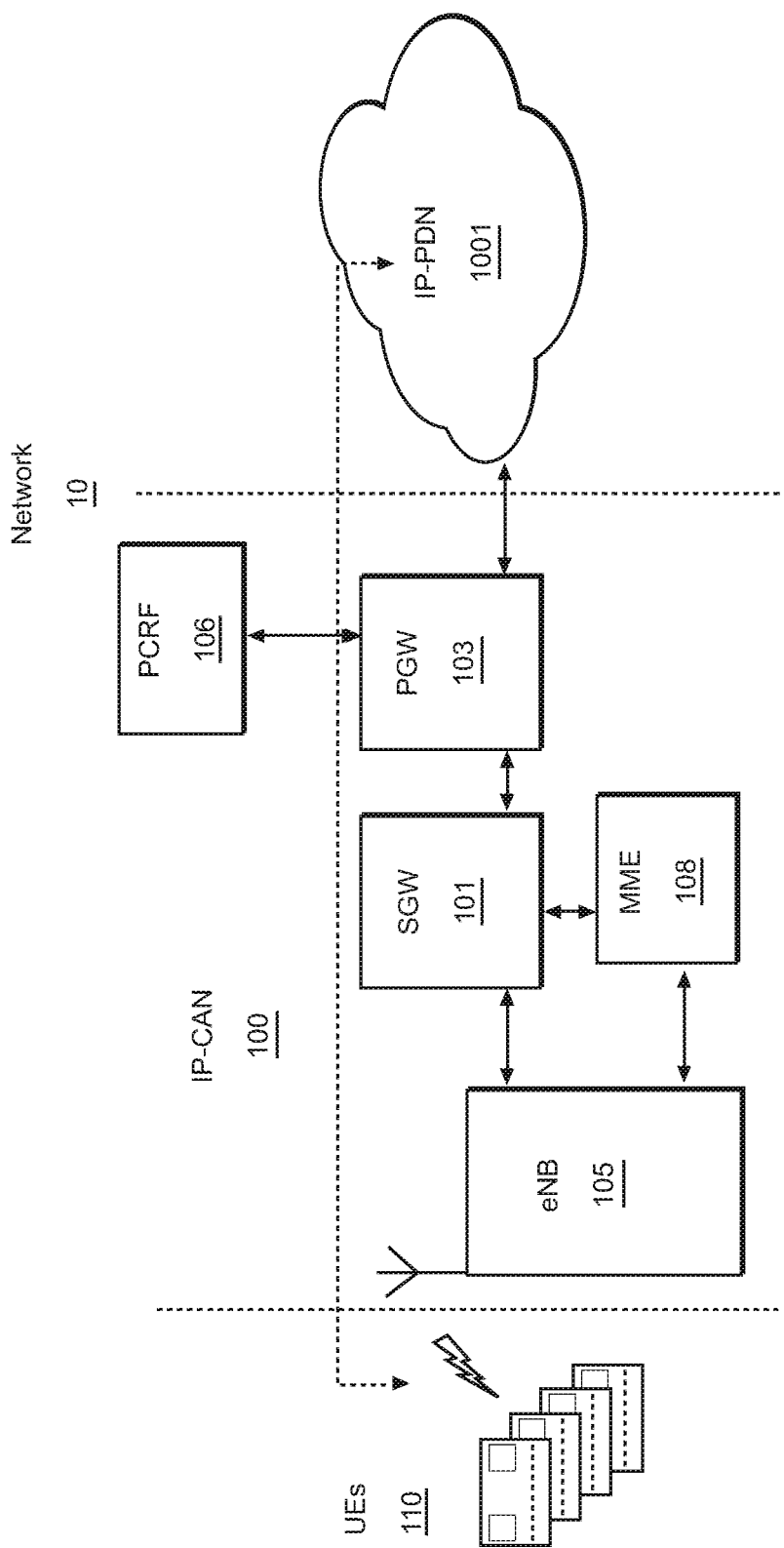
FIG. 1 illustrates a $3^{rd}$ Generation Partnership Project Long-Term Evolution (3GPP LTE) network.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing small wireless cells, base stations, NodeBs, user equipments (UEs) including multi-mode UEs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), macro cell, etc., and describes a transceiver in communication with and providing wireless resources to users in a geographical coverage area. As discussed herein, eNBs may have all functionally associated with conventional, well-known base stations in addition to the capability and functionality discussed herein.

The term "user equipment" or "UE", as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a 3GPP LTE network).

According to example embodiments, UEs, eNBs, etc. may be (or include) hardware, firmware, hardware executing software, or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs), computers, or the like, configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

FIG. 1 illustrates a $3^{rd}$ Generation Partnership Project Long-Term Evolution (3GPP LTE) network 10. The network 10 includes an Internet Protocol (IP) Connectivity Access Network (IP-CAN) 100 and an IP Packet Data Network (IP-PDN) 1001. The IP-CAN 100 includes: a serving gateway (SGW) 101; a packet data network (PDN) gateway (PGW) 103; a policy and charging rules function (PCRF) 106; a mobility management entity (MME) 108, and an eNode B (eNB) 105. Although not shown, the IP-PDN 1001 may include application or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, the PCRF 106, and the MME 108 is referred to as an Evolved Packet Core (EPC). Elements of the EUTRAN may be referred to herein as RAN elements. Although only a single eNB 105 is shown in FIG. 1, the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for one or more user equipments (UEs) 110. That is to say, any number of UEs 110 may be connected (or attached) to the eNB 105. The eNB 105 is operatively coupled to the SGW 101 and the MME 108. Additional functionality of the eNB 105 will be discussed in more detail later.

The SGW 101 routes and forwards user data packets, while also acting as the mobility anchor for the user plane during inter-eNB handovers of UEs. The SGW 101 also acts as the anchor for mobility between 3GPP LTE and other 3GPP technologies. For idle UEs 110, the SGW 101 terminates the downlink data path and triggers paging when downlink data arrives for UEs 110.

The PGW 103 provides connectivity between UE 110 and the external packet data networks (e.g., the IP-PDN) by being the point of entry/exit of traffic for the UE 110. As is known, a given UE 110 may have simultaneous connectivity with more than one PGW 103 for accessing multiple PDNs.

The PGW 103 also performs policy enforcement, packet filtering for UEs 110, charging support, lawful interception and packet screening, each of which are well-known functions. The PGW 103 also acts as the anchor for mobility upon SGW relocation during handovers within the 3GPP LTE network, as well as between 3GPP and non-3GPP technologies, such as Worldwide Interoperability for Microwave Access (WiMAX) and 3rd Generation Partnership Project 2 (3GPP2 (code division multiple access (CDMA) 1× and Enhanced Voice Data Optimized (EvDO)).

Still referring to FIG. 1, eNB 105 is also operatively coupled to the MME 108. The MME 108 is the control-node for the EUTRAN, and is responsible for idle mode paging and tagging procedures including retransmissions. The MME 108 is also responsible for choosing a particular SGW for a UE during initial attachment of the UE to the network, and during intra-LTE handover involving CN node relocation. The MME 108 authenticates UEs 110 by interacting with a Home Subscriber Server (HSS), which is not shown in FIG. 1.

The Policy and Charging Rules Function (PCRF) 106 is the entity that makes policy decisions and sets charging rules. The PCRF 106 has access to subscriber databases and plays a role in the 3GPP architecture.

Figure 2:
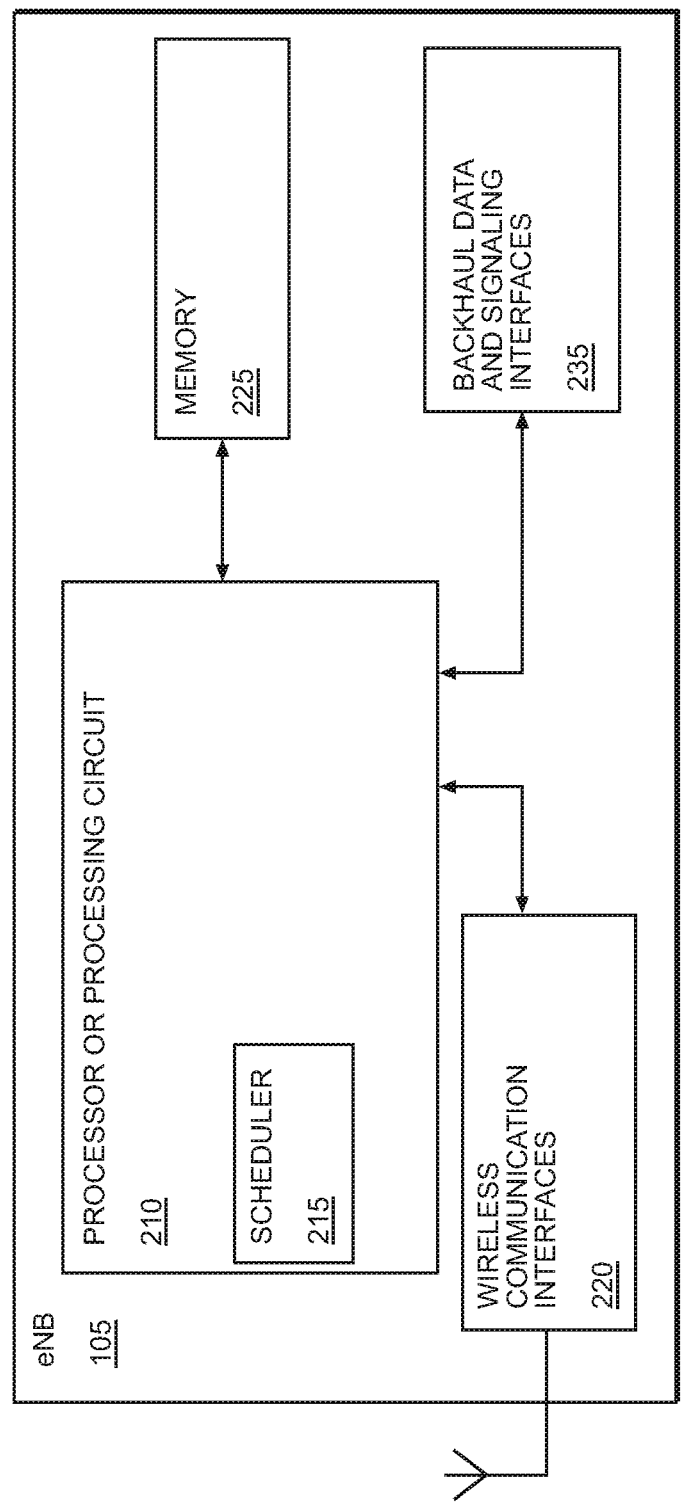
FIG. 2 illustrates an eNodeB (eNB) according to an example embodiment.

FIG. 2 illustrates an example embodiment of the eNB 105 shown in FIG. 1.

Referring to FIG. 2, the eNB 105 includes: a memory 225; a processor 210; a scheduler 215; wireless communication interfaces 220; and backhaul data and signaling interfaces 235. The processor or processing circuit 210 controls the function of the eNB 105 (as described herein), and is operatively coupled to the memory 225 and the interfaces 220 and 235. While only one processor 210 is shown in FIG. 2, it should be understood that multiple processors may be included in a typical eNB 105. The functions performed by the processor 210 may be implemented using hardware and/or a combination of hardware and software. As discussed above, such hardware may include one or more Central Processing Units (CPUs), digital signal processors (DSPs), application-specific-integrated-circuits, field programmable gate arrays (FPGAs) computers or the like. The term processor, used throughout this document, may refer to any of these example implementations, though the term is not limited to these examples. The memory 225 may store computer-executable instructions that, when executed, cause the processor to perform the functions discussed herein.

Throughout this document the terms eNB and cell may be used interchangeably.

Still referring to FIG. 2, the communication interfaces 220 include various interfaces including one or more transmitters/receivers connected to one or more antennas to wirelessly transmit/receive control and data signals to/from UEs 110, or via a control plane. The communication interfaces 220 and the one or more antennas may be referred to as transceivers. Backhaul interfaces 235 are the portion of eNB 105 that interface with SGW 101, MME 108, other eNBs, or interface to other EPC network elements and/or RAN elements within IP-CAN 100.

The memory 225 may buffer and store data that is being processed at eNB 105, as well as data that is transmitted and received to and from eNB 105. Additionally, as mentioned above, the memory 225 may store computer-executable instructions that, when executed, cause the processor 210 to perform the functions discussed herein. The memory 225 may also store an operating system and any other routines/modules/applications for providing the functionalities of the eNB 105 to be executed by the processor 210. These software components may also be loaded from a separate computer readable storage medium into the memory 225 using a drive mechanism (not shown). Such separate computer readable storage medium may include a disc, tape, DVD/CD-ROM drive, memory card, or other like computer readable storage medium (not shown). In some embodiments, software components may be loaded into the memory 225 via one of the various interfaces, rather than via a computer readable storage medium.

Still referring to FIG. 2, the scheduler 215 schedules control and data communications that are to be transmitted and received by the eNB 105 to and from UEs 110.

The following discussion of example embodiments will be described with regard to a scheduler and a UE. In this discussion, the scheduler may refer to the scheduler 215 in FIG. 2, and the UE may refer to a UE 110 shown in FIGS. 1 and 5.

On the uplink (from UE and eNB), a radio frame of a signal used to transmit control information or data may be configured to have a duration of about 10 milliseconds (ms). In one example, each radio frame is segmented or divided into 10 subframes, each of which is about 1 ms long. Each subframe is further subdivided into two slots, each with a duration of about 0.5 ms.

For a component carrier (CC), each of the slots used for uplink transmission by the UE to the eNB may include multiple physical resource blocks (PRBs). A PRB is defined as a set of consecutive Orthogonal-Frequency-Division-Multiplex (OFDM) symbols (e.g., a set of 6 or 7 symbols) in the time domain and a set of consecutive subcarriers (e.g., a set of 12 subcarriers) in the frequency domain. In one example, if the number of consecutive OFDM symbols is 7 and the number of consecutive subcarriers is 12, then a PRB includes 84 resource elements (REs). In another example, if the number of consecutive OFDM symbols is 6 and the number of consecutive subcarriers is 12, then a PRB includes 72 resource elements (REs). PRBs are allocated to UEs in pairs. In this example, one PRB pair includes 144 REs.

The number of bits that may be transmitted in each RE depends on the modulation and coding scheme (MCS) applied for the PRB pair. In other words, the MCS assigned to a PRB pair defines how many bits of information may be packed into a PRB pair. For example, in the case of quadrature-phase-shift-keying (QPSK) modulation each RE in a PRB pair may be used to transmit two bits of information. In this example, one PRB pair may support transmission of 288 encoded symbols or bits since each PRB pair includes 144 REs. Greater numbers of bits may be transmitted in each RE using other types of modulation, such as 16-Quadrature Amplitude Modulation (QAM) or 64-QAM. A lesser number of bits (e.g., a single bit) may be transmitted in each RE using, for example, binary-phase-shift-keying (BPSK) modulation.

In a 3GPP-LTE network, the Physical Uplink Control CHannel (PUCCH) carries uplink control information (UCI). UCI may include channel state information (CSI) reports, Hybrid Automatic Retransmission reQuest (HARQ) ACKnowledgment/Negative ACKnowledgment (ACK/NACK or A/N) information, uplink scheduling requests (SR), etc.

The PUCCH may support multiple formats (referred to as PUCCH formats) with various modulation and coding schemes (MCS). For example, PUCCH format 1b (using, e.g., QPSK modulation) may be used to convey a two-bit HARQ-ACK, which can be used for carrier aggregation, whereas PUCCH format 1a (using, e.g., BPSK modulation) may be used to convey only a single bit of information.

As discussed above, in 3GPP-LTE Release 8 (Rel-8) and Release 10 (Rel-10), the PUCCH was designed to allocate wireless resources (e.g., PRBs) to UEs for PUCCH transmissions semi-statically to provide relatively high multiplexing capability. In this regard, PUCCH formats 1, 1a, and 1b are defined in Rel-8 to support A/N feedback (e.g., transmission of A/N bits) with a multiplexing capacity of up to 24 UEs. In Rel-10, PUCCH format 1b with channel selection was specified to support up to 4 UEs. Also in Rel-10, PUCCH format 3 was designed to support up to 20 bits with multiplexing capacity of 5 UEs. As mentioned above, however, the PUCCH resources for formats 1, 1a, 1b and 3 are allocated semi-statically, and thus, persist for multiple subframes of a radio frame. Consequently, PUCCH resources assigned in this manner are not reused when the load is relatively low or zero in a cell and/or format. Moreover, the MCSs for the PUCCH are designed for coverage, and fixed for PUCCH formats 1, 1a, 1b and 3. In this context, the multiplexing capacity is fixed even if all UEs are experiencing relatively good channel conditions.

To support a relatively large number of A/N bits for UEs in a primary cell (PCell), example embodiments provide an additional PUCCH format (e.g., format 4) having dynamic resource allocation. The resource allocation is scheduled along with Physical Downlink Shared CHannel (PDSCH) resource allocation with link adaptation. By utilizing the PUCCH format 4, the scheduler allocates wireless resources to UEs in each subframe dynamically and without persistence of the wireless resources between subframes of a radio frame. In other words, the scheduler may allocate wireless resources to UEs in each subframe independently of wireless resources allocated in other subframes of a radio frame. The scheduler also assigns MCSs (e.g., BPSK, QPSK, etc.) for PUCCH transmissions dynamically based on radio channel conditions for transmitting UEs. According to at least some example embodiments, the PUCCH has the flexibility to multiplex UEs with different MCSs (and thus different numbers of A/N bits) within a single radio frame.

The payload size of the PUCCH format, according to one or more example embodiments, is relatively large (e.g., about 128 or 480 bits). Dynamic resource allocation for the PUCCH format allows the scheduler to optimize the resource utilization for both PUSCH and PUCCH channels according to at least some example embodiments.

The PUCCH format according to one or more example embodiments supports Hybrid Automatic Repeat reQuest-ACKnowledgement (HARQ-ACK) feedback for aggregation of up to 32 component carriers for both frequency division duplexing (FDD) and time division duplexing (TDD). The maximum number of A/N bits for TDD configuration 5 with multiple-input-multiple-output (MIMO) configuration is 576 bits (32 component carriers with 18 HARQ processes). In general, the number of A/N bits for FDD and TDD configurations is between 64 and 470 bits for up to 32 component carrier aggregation. Accordingly, one physical resource block (PRB) may support 128 A/N bits with sufficient channel code rate, and more than one PRB may be allocated when the number of A/N bits is relatively high (e.g., over 128 bits).

One PRB is the default radio resource for the PUCCH channel since most of time the number of A/N bits associated with an HARQ-ACK feedback is less than 128 bits. In a TDD system, the number of A/N bits to transmit is based on the configured number of component carriers and the TDD configuration. When a larger number of component carriers (more than 20) are configured for TDD configuration 4 or 5, more than one PRB may be semi-statically configured by a higher layer at the time of carrier aggregation is configured.

At least some example embodiments provide for dynamic configuration of the PUCCH on a per-subframe basis. In this regard, at least some PRBs for the PUCCH channel are not semi-static, and do not persist throughout multiple subframes of a radio frame. PRB pairs may be configured dynamically, and explicitly indicated to the UE in the downlink (DL) grant when the PDSCH is scheduled for transmission. Dynamic PUCCH resource allocation provides the scheduler with the flexibility to allocate individual resources for either the PUCCH with a relatively large payload or PUSCH within each subframe, independent or regardless of whether a particular resource was allocated for the PUCCH or the PUSCH in a previous subframe of a radio frame. According to at least some example embodiments, the PRB indication of allocated PUCCH resources may be included in: a DL grant in the PCell; a DL grant received in the first secondary cell (SCell) if the PCell does not have scheduling grant; or in DL grants received in both the PCell and SCells. As is known, the PCell is the serving cell for a UE that handles the RRC connection for the UE.

According to at least some example embodiments, the dynamic allocation of radio resources in each subframe by the scheduler may be fully dynamic or partially dynamic.

Fully dynamic resource allocation may be similar to PUSCH resource allocation. In one example, the starting PRB and the number of PRBs used for the new PUCCH format may be indicated by the DCI format for the PDCCH using PUSCH resource allocation. This method may allow for flexibility in resource mapping of any location and any number of PRBs within the UL spectrum.

With regard to partially dynamic resource allocation, the PUCCH format resources may be semi-statically pre-configured by higher layer signaling. In this example, an indication field with a number of bits (e.g., a 2-bit ACK/NACK Resource Indication field in place of the 2-bit TPC field) is included in the UL grant (e.g., DCI format 0/4 to indicate one of the 4 pre-configured PUCCH resources (2-bit)).

Figure 3:
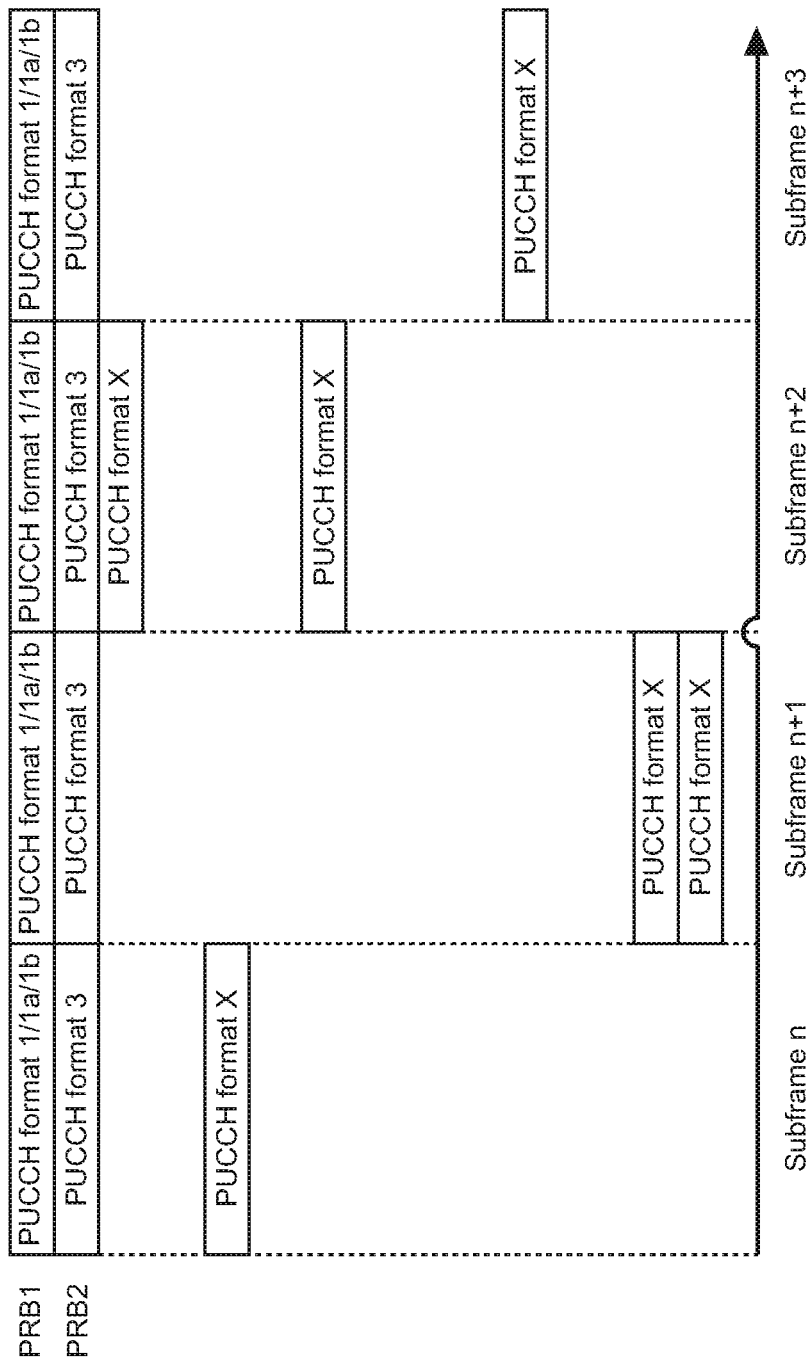
FIG. 3 illustrates an example dynamic configuration of physical resource block (PRB) pairs within subframes of a radio frame, according to an example embodiment.

FIG. 3 illustrates example dynamic configuration of PRB pairs within subframes of a radio frame, according to an example embodiment.

Referring to FIG. 3, each of the subframes n, n+1, n+2 and n+3 includes PRBs (e.g., PRB1 and PRB2) allocated semi statically for PUCCH format 1/1a/1b and format 3. Additionally, each of the subframes n, n+1, n+2 and n+3 includes at least one dynamically allocated PRB pair for PUCCH format X (referred to herein as format 4 as well). In this example, format X refers to the PUCCH format according to one or more example embodiments. Although the example embodiment shown in FIG. 3 shows PRBs PRB1 and PRB2 allocated semi-statically, example embodiments should not be limited to this example. Rather, all PRBs may be allocated dynamically within each subframe. Moreover, within each subframe more than one PRB pair may be allocated for PUCCH format X.

For dynamic resource allocation across the whole system bandwidth (e.g., without semi-static allocation of PRBs), the scheduler may generate and output a PUCCH resource indicator indicating the allocation of the PRBs to the PUCCH for each UE. As mentioned above, the indicator may be included in the DL grant when the PDSCH is scheduled for transmission. The number of bits required to indicate allocation of the PRBs to the PUCCH ranges from 3 to 7 bits depending on the system bandwidth (e.g., 1.4 MHz for 6 PRBs, 3 MHz for 12 PRBs, 5 MHz for 25 PRBs, 10 MHz for 50 PRBs, 15 MHz for 75 PRBs, and 20 MHz for 100 PRBs). The PUCCH PRB allocation across system bandwidth provides flexibility to the scheduler, for example, by enabling the scheduler to utilize frequency selective channel gain and/or optimize spectral efficiency.

As an alternative, a subset of PRB pairs allocated for PUCCH transmissions may be configured by higher layer signaling to limit the number of bits required to indicate PUCCH resource allocation to a UE. A selected subset of PRB pairs may be consecutive PRBs without fragmenting the uplink spectrum for PUCCH transmission. A selected subset of PRB pairs may achieve similar frequency selective channel gain if the configured subset of PUCCH PRB pairs covers all sub-bands.

According to one or more example embodiments, the scheduler also determines and assigns a MCS for PUCCH transmissions by a UE within each PRB pair.

Figure 6:
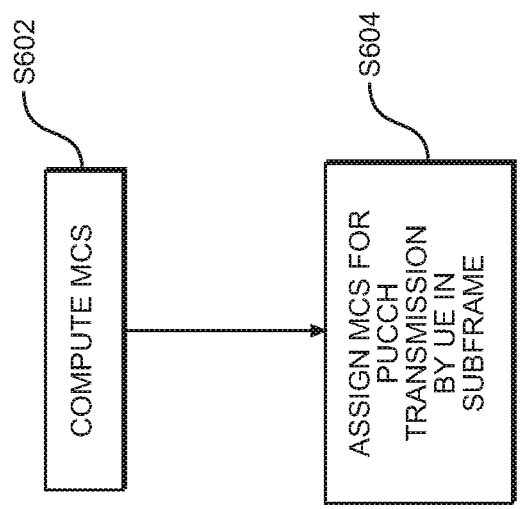
FIG. 6 is a flow chart illustrating a method for assigning modulation and coding schemes (MCSs) to UEs, according to an example embodiment.

FIG. 6 is a flow chart illustrating an example embodiment of a method for assigning an MCS for PUCCH transmission to a UE.

Referring to FIG. 6, at step S602, the scheduler computes the MCS based on a Channel Quality Indicator (CQI) derived from the measured UE wireless channel in the form of Signal to Interference and Noise Ratio (SINR) from an uplink sounding reference signal (SRS) at the eNB.

At step S604, the scheduler assigns the MCS for PUCCH transmissions by the UE in each subframe dynamically based on channel conditions for the UE during the subframe or a previous subframe. In at least one example embodiment, the scheduler may explicitly signal the MCS to the UE using a downlink control information (DCI) format indicator. In this example, a MCS field is included in DCI formats for both downlink and uplink grants for PDSCH and PUSCH respectively when scheduling a UE for transmission on the PUCCH. According to at least some example embodiments, one or more additional MCS fields may be included in the uplink DCI format indicator for the PUCCH format. The scheduler may provide the MCS for the PUCCH transmissions by the UE along with the PUCCH resource indicator when the UE is scheduled for transmission on the PDSCH. Dynamic MCS allows the scheduler to allocate less radio resources to transmit the same number of A/N bits when UE's channel conditions are relatively good. In one example, the number of MCS bits may be 5 based on the MCS table or a selected subset of MCS with a reduced number of bits (e.g., 1-3 bits), depending on the channel conditions for a UE.

When larger numbers of A/N information bits are transmitted on the PUCCH, UEs may utilize channel coding on the PUCCH to improve performance. According to at least some example embodiments, UEs may employ channel coding, such as block coding, turbo coding, convolutional coding, rather than repetition coding or discrete Fourier transform (DFT) precoding as in the conventional art. In one example, a UE may channel code the PUCCH channel by reusing turbo coding principles used for PUSCH channel coding. This may serve to align the implementation of the PUCCH and the PUSCH. Turbo coding has better performance than current repetition coding or DFT precoding to battle fast fading effects. In one example, the channel coding gain may be significant when the number of A/N bits is relatively large (e.g., between 60 and 124 bits as compared to the current repetition code). Moreover, the number of A/N bits may be relatively large for a UE transmitting on the PUCCH or multiple UEs transmitting on the PUCCH in the same PRB with OCC (discussed below).

UEs may also utilize tail-biting convolutional coding (TBCC) for the PUCCH. As is known, TBCC has better performance than Turbo coding with smaller payload size (e.g., less than 200 bits).

When a larger number of A/N bits are being fed back to the eNB on the PUCCH, UEs may also add a cyclic redundancy check (CRC) to improve reliability of the transmissions. In one example, UEs may add a CRC at the end of the A/N bit stream for additional reliability. As is known, CRC is considered overhead. When the number of transmitted A/N bits is small, CRC overhead may be relatively high. However, as the number of A/N bits increases, the ratio of CRC overhead to the number of A/N bits decreases. In one example, an 8-bit CRC may be used to attach at the end of A/N bit stream similar to that used in conjunction with PDCCH payload.

According to at least some example embodiments, A/N bits for multiple UEs may be multiplexed within pairs of PRBs. In one example, one PRB pair may have 144 resource elements (REs). As mentioned above, using QPSK, one PRB pair may support transmission of 288 encoded symbols. Using 16-QAM, one PRB pair may support transmission of 576 encoded symbols. With ⅓ the code rate of channel coding, one PRB pair may support 96 A/N bits and 192 A/N bits with QPSK and 16QAM modulation, respectively. With a dynamic coding rate and rate matching, one PRB pair may support up to 500 A/N bits without any A/N bundling. Accordingly, one PRB may be sufficient to support most cases up to aggregation of 32 component carriers for a single UE.

For between 20 and 96 A/N bits, the PUCCH may be multiplexed with other users by using an orthogonal cover code (OCC), such as a Walsh code, as the spreading factor in the frequency domain.

Figure 4:
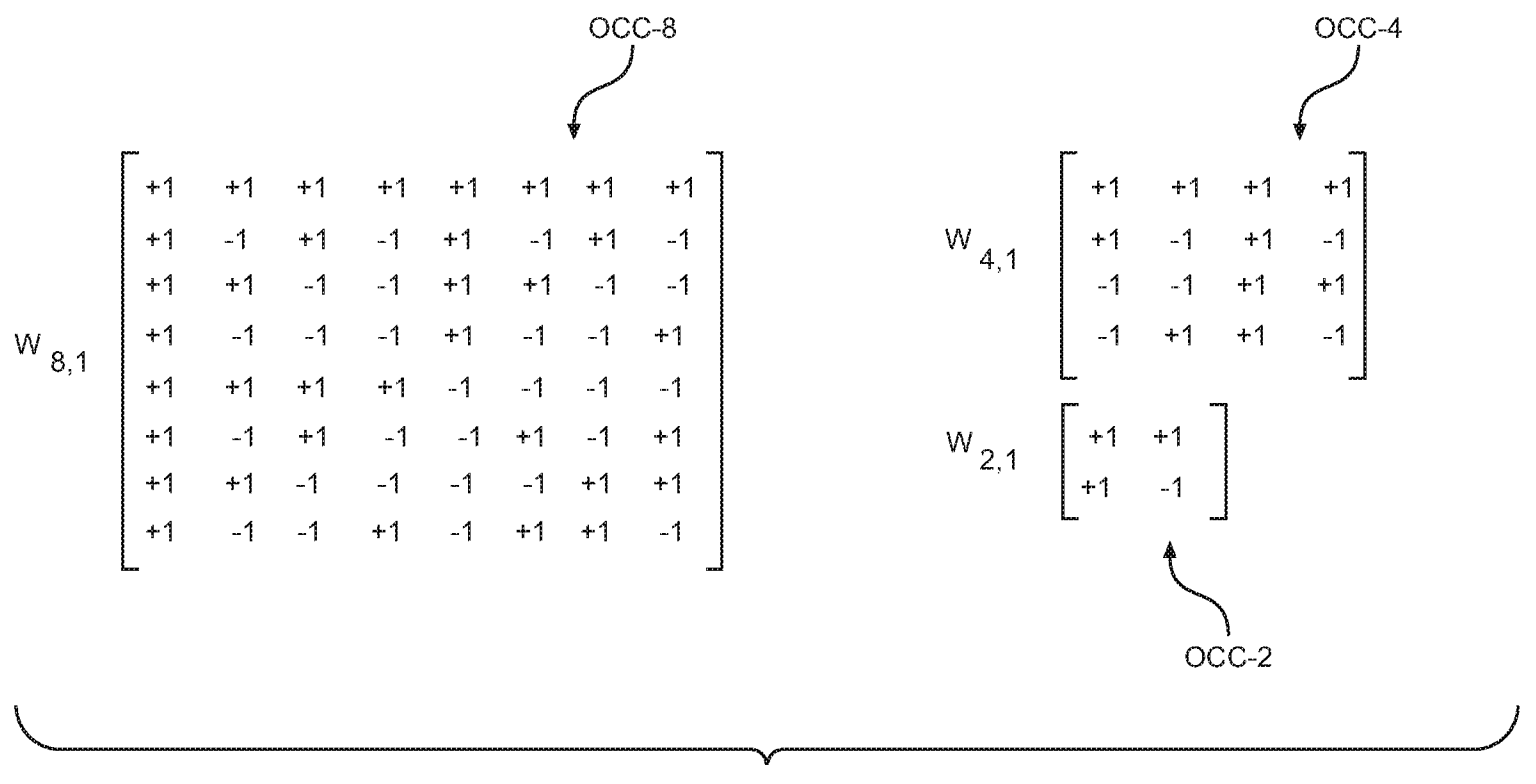

OCC allows for multiplexing of A/N bits for different UEs with different number of A/N bits and/or different MCSs. This enables different UEs to transmit on the same PUCCH with different OCCs paired with different demodulation reference signal (DMRS) cyclic shifts for channel estimation. The receiver (e.g., the eNB) may use the OCC to separate A/N bits for different UEs, and to obtain the spreading gain. When OCC is used in the frequency domain, the number of REs is reduced by ½ for OCC-2, by ¼ for OCC-4, and by ⅛ for OCC-8. FIG. 4 illustrates example Walsh coding for OCC-2, OCC-4 and OCC-8, in accordance with an example embodiment.

Figure 5:
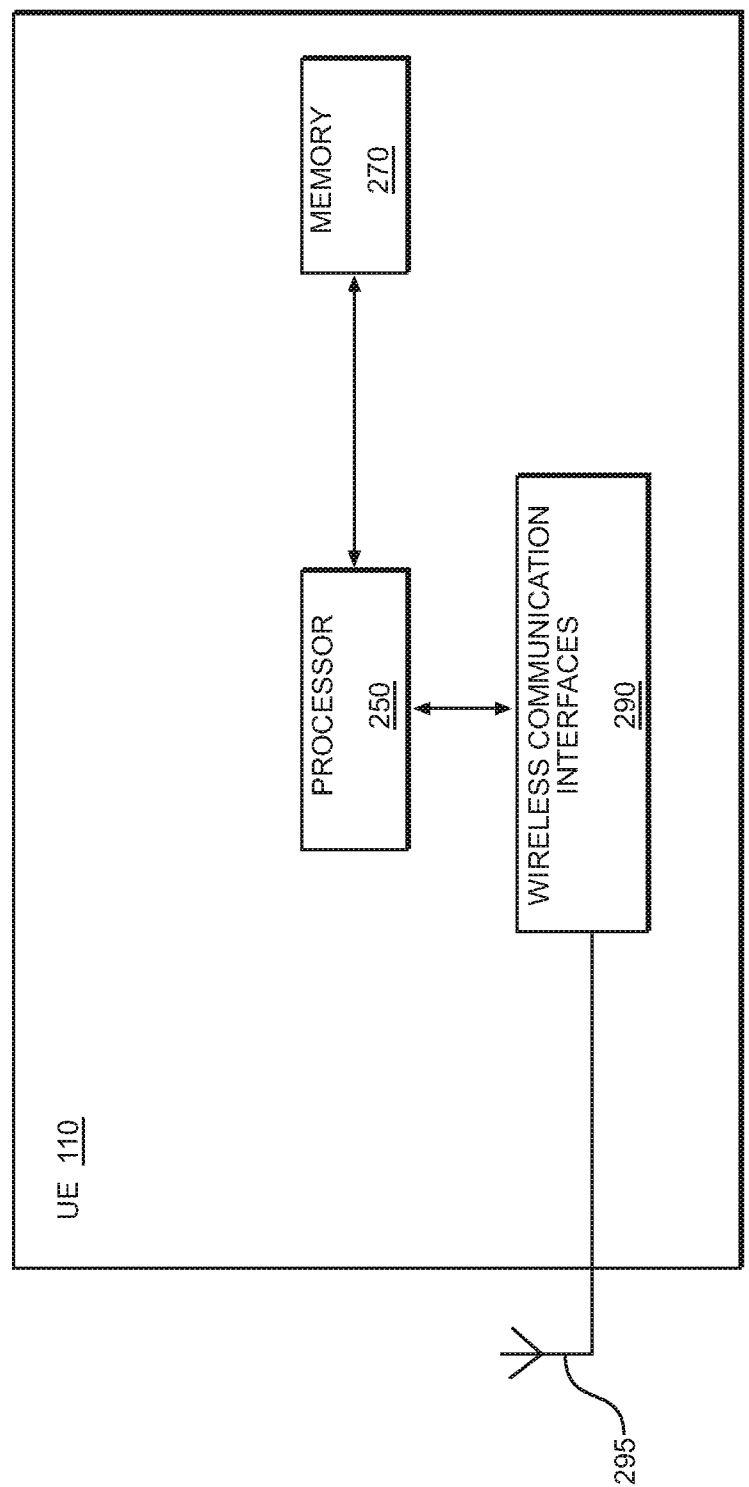
FIG. 5 illustrates an example embodiment of a user equipment (UE).

FIG. 5 illustrates an example of the UE 110 shown in FIG. 1.

Referring to FIG. 5, the UE 105 includes: a memory 270; a processor 250 connected to the memory 270; various interfaces 290 connected to the processor 250; and an antenna 295 connected to the various interfaces 290. The various interfaces 290 and the antenna 295 may constitute a transceiver for transmitting/receiving data from/to the eNB 105. As will be appreciated, depending on implementation, the UE 110 may include many more components than those shown in FIG. 5. However, it is not necessary that all of these generally conventional components be shown in order to disclose the illustrative example embodiment.

The memory 270 may be a computer readable storage medium that generally includes a random access memory (RAM), a read only memory (ROM), and/or a permanent mass storage device, such as a disk drive. The memory 270 also stores an operating system and any other routines/modules/applications for providing the functionalities of the UE 110 (e.g., functionalities of a UE, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the arithmetical, logical, and input/output operations of the system. Instructions may be provided to the processor 250 by the memory 270.

The various interfaces 290 may include components that interface the processor 250 with the antenna 295, or other input/output components. As will be understood, the interfaces 290 and programs stored in the memory 270 to set forth the special purpose functionalities of the UE 110 will vary depending on the implementation of the UE 110.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A radio access network element comprising:
a transceiver configured to communicate with at least a first user equipment; and
a processor operatively coupled to the transceiver, the processor being configured to allocate first wireless resources for transmission of first control information by the first user equipment on an uplink control channel during at least a first subframe among a plurality of subframes of a radio frame, the first wireless resources being assigned a format independent of wireless resources allocated for transmission during others of the plurality of subframes of the radio frame.

2. The radio access network element of claim 1, wherein the wireless resources include physical resource block (PRB) pairs; and
the processor is further configured to assign PRB pairs having different formats for transmission on the uplink control channel during the first subframe and at least one second subframe from among the plurality of subframes of the radio frame.

3. The radio access network element of claim 1, wherein the uplink control channel is a Physical Uplink Control Channel (PUCCH).

4. The radio access network element of claim 1, wherein the processor is further configured to allocate second wireless resources for transmission of second control information by a second user equipment on the uplink control channel semi-statically such that a format of the second wireless resources persist throughout multiple ones of the plurality of subframes of the radio frame.

5. The radio access network element of claim 1, wherein the processor is further configured to assign a modulation and coding scheme for transmission of the first control information by the first user equipment on the uplink control channel within the first subframe, the modulation and coding scheme being determined independent of a modulation and coding scheme assigned for transmissions on the uplink control channel in the others of the plurality of subframes.

6. The radio access network element of claim 5, wherein the processor is further configured to determine the modulation and coding scheme based on channel conditions for the first user equipment.

7. The radio access network element of claim 1, wherein the transceiver is further configured to transmit wireless resource allocation information indicative of the first wireless resources allocated to the first user equipment for transmission of the first control information on the uplink control channel.

8. The radio access network element of claim 7, wherein the wireless resource allocation information is transmitted along with a downlink grant for a downlink shared channel between the radio access network element and the first user equipment.

9. The radio access network element of claim 8, wherein the wireless resource allocation information includes a number of bits, the number of bits being determined based on system bandwidth.

10. The radio access network element of claim 1, wherein the first control information is Hybrid Automatic Retransmission reQuest (HARQ) ACKnowledgment/Negative ACKnowledgment (ACK/NACK) information.

11. The radio access network element of claim 1, wherein
the others of the plurality of subframes include a second subframe;
the processor is configured to assign the format to the first wireless resources independent of wireless resources allocated for transmission during the second subframe; and
the first subframe and the second subframe are consecutive subframes.

12. A radio access network element comprising:
a transceiver configured to communicate with a plurality of user equipments; and
a processor operatively coupled to the transceiver, the processor being configured to allocate wireless resources to the plurality of user equipments for transmission of control information on an uplink control channel in a plurality of subframes of a radio frame, the wireless resources being allocated to the plurality of user equipments dynamically such that a format of at least a portion of the allocated wireless resources does not persist for greater than 1 subframe of the radio frame.

13. The radio access network element of claim 12, wherein the processor is further configured to allocate wireless resources for uplink control channel transmissions within each of the plurality of subframes independent of allocation of the wireless resources for uplink control channel transmissions in others of the plurality of subframes.

14. A radio access network element comprising:
a transceiver configured to communicate with a plurality of user equipments; and
a processor operatively coupled to the transceiver, the processor being configured to assign modulation and coding schemes for transmission of control information by the plurality of user equipments on an uplink control channel within a plurality of subframes of a radio frame, the modulation and coding schemes being determined dynamically for each of the plurality of subframes based on channel conditions for the plurality of user equipments.

15. The radio access network element of claim 14, wherein the uplink control channel is a Physical Uplink Control Channel (PUCCH).

16. The radio access network element of claim 14, wherein the modulation and coding schemes include at least one of BPSK, QPSK, 16-QAM, and 64-QAM.

17. The radio access network element of claim 14, wherein the processor is further configured to determine the channel conditions for the plurality of user equipments based on channel quality information (CQI).

18. The radio access network element of claim 14, wherein the transceiver is further configured to signal the assigned modulation and coding schemes to the plurality of user equipments using downlink control information (DCI) format indicators.

19. The radio access network element of claim 18, wherein the transceiver is further configured to transmit, along with the assigned modulation and coding schemes, wireless resource allocation information indicative of wireless resources allocated to the plurality of user equipments for transmission of the control information on the uplink control channel in the subframe.

* * * * *